United States Patent [19]
Yun

[11] Patent Number: 5,765,505
[45] Date of Patent: Jun. 16, 1998

[54] SANITARY BIRD HOUSE

[76] Inventor: Chang-geun Yun, 696 Mansu-6-dong Namdong-gu, Inchonkwangyok-shi, Rep. of Korea, 405-246

[21] Appl. No.: 853,067

[22] Filed: May 8, 1997

[30] Foreign Application Priority Data

May 8, 1996 [KR] Rep. of Korea ............... 96-11167
Mar. 7, 1997 [KR] Rep. of Korea ............... 97-4188

[51] Int. Cl.$^6$ ............... A01K 31/06; A01K 31/04
[52] U.S. Cl. ............... 119/432; 119/458; 119/459; 119/479
[58] Field of Search ............... 119/458, 462, 119/463, 472, 474, 479, 432, 438, 461

[56] References Cited

U.S. PATENT DOCUMENTS

| | | | |
|---|---|---|---|
| 922,020 | 5/1909 | Mulzier | 119/474 |
| 2,530,148 | 11/1950 | Bjoeklund et al. | 119/474 |
| 3,550,558 | 12/1970 | Sachs | 119/458 |
| 3,815,549 | 6/1974 | Opmeer | 119/472 |
| 4,023,531 | 5/1977 | Thompson | 119/458 |
| 4,212,269 | 7/1980 | White et al. | 119/458 |
| 4,498,921 | 2/1985 | Lovitt | 119/479 |
| 4,552,093 | 11/1985 | Puckett | 119/463 |
| 5,452,681 | 9/1995 | Ho | 119/474 |

*Primary Examiner*—Paul J. Hirsch

[57] ABSTRACT

This invention relates to a closed type of sanitary bird house comprises a body part including a frame provided with slide grooves formed, and transparent viewing side walls, a base support located under the body part to hold the body part, a door member provided as a cover of the body part, an inclined bottom plate, and a discharging system, wherein the discharging system operates to remove the garbage, bad smell and the impure air in the bird house and the closed transparent viewing walls prevent the foul air in the bird house from streaming into users' room, so that the inside and outside environment of the sanitary bird house may be maintained clean and the users may enjoy the observation of the pet birds through the transparent viewing walls.

1 Claim, 4 Drawing Sheets

SANITARY BIRD HOUSE

FIELD OF THE INVENTION

This invention relates to a sanitary bird house which comprises a transparent body part base supported by a base support of a predetermined height to watch pet birds therein easily and a disposal system of soil, feathers and the like to maintain clean environment.

DESCRIPTION OF THE PRIOR ART

The existing bird cage for keeping the pet birds at home comprises lattice in the shape of thick meshes, thereby the pet birds can be observed therethrough.

However, the conventional bird cages have disadvantages that bad smell and dirt due to soil, feathers and the like may come out from the bird cages to the inside of a room through the opened lattice, thereby tainting the air of the room and even causing chest complaints.

The conventional open-type of bird cages have further disadvantages that it is impossible to adjust temperature and humidity suitable to each bird cage occupied by different kind of birds in a bird shop and additional facilities become required to protect the birds against sudden rains or wind in the rainy season and to keep the bird cages warm in the cold season.

SUMMARY OF THE INVENTION

It is, therefore, an object of the present invention to provide a sanitary bird house which comprises a disposal system for discharging soil, feathers and the like through discharging pipes into disposal bags, thereby maintaining the bird house and users' room or shop clean from garbage and its bad smell.

Another object of the present invention is to provide a sanitary bird house which is made of transparent materials for observing the birds in the bird house closely and safely.

Still another object of the present invention is to provide a sanitary bird house which is capable of sheltering from the rain and keeping warmth.

According to the present invention, a sanitary bird house comprises:

a body part including a frame, provided with slide grooves formed, and viewing side walls to be introduced through the slide grooves in the frame, one viewing side wall being provided with an outlet;

a base support located under the body part to hold the body part;

a door member associated with the body part by means of hinges on the top edges thereof as a cover to open and/or close the body part and including a frame provided with a through hole and longitudinal slide grooves, a viewing wall inserted into the through hole and fitted with the slide grooves in the frame, a vent port and a handle;

a bottom plate, which is longitudinally slanted and fitted with the lower edges of the body part, having longitudinal side portions which are slanted to the center from the edges and an outlet covered with a filtering net on a relatively lower portion; and a discharging system including discharging pipes having a plurality of fans and filters positioned in a certain interval, disposal bags, wherein the discharging pipes are respectively interposed between the outlets respectively formed on the side wall of the body part and the bottom plate and the disposal bags, and a discharging bag in the shape of a drawer is fitted to one of the discharging pipe to be communicated therewith;

wherein the discharging system operates to remove bad smell and dirt due to soil, feathers and the like in the bird house and the closed transparent viewing walls prevent the foul air in the bird house from streaming into users' room, so that the inside and outside environment of the sanitary bird house may be maintained clean and the users may enjoy the observation of the pet birds through the transparent viewing walls.

BRIEF DESCRIPTION OF THE DRAWINGS

The present invention will become apparent upon reading the following detailed description of exemplary embodiments and upon reference to the accompanying drawings, in which.

DETAILED DESCRIPTION OF THE INVENTION

Figure 1:
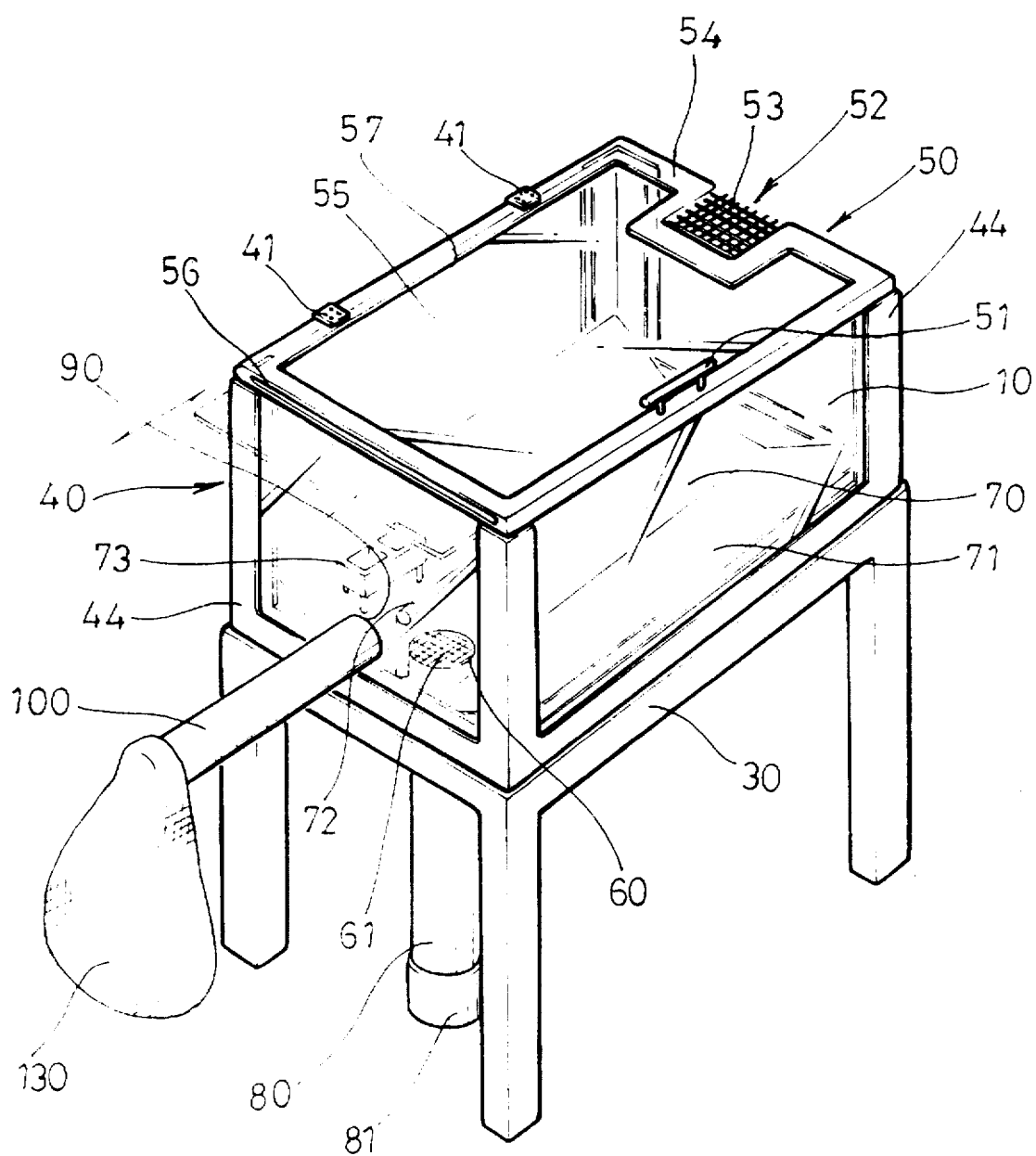
FIG. 1 is a schematical perspective view showing an embodiment of a sanitary bird house according to the present invention.

FIG. 1 is a schematical perspective view showing a basic structure of a sanitary bird house according to the present invention.

Referring to FIG. 1, in the sanitary bird house according to the present invention, a body part 40 comprises a frame 44 provided with slide grooves 45 and viewing walls 10 made of transparent materials such as acryl.

A door member 50 as a cover of the body part 40 is located at the top of the frame 44 of the body part 40 and attached at one side thereof by means of hinges 41 for opening and/or closing the door member 50 by handle 51 as needed, for example, when feeding birds or when bird coming in and out. Further, a vent port 52 is provided on the door member 50 for ventilating the inside of the body part 40. In this case, the vent port 52 is covered with a wire net to prevent relatively small birds from flying off.

The body part 40 comprises a frame 44 having free top edges and slide grooves 45 along the other edges, so that the viewing walls 10 are inserted through the free top edges of the body part 40 and then fitted in the slide grooves 45.

The door member 50 comprises a frame 54 having a through-hole 56 at one side and slide grooves 57 along the other edges, so that the viewing wall 55 is inserted through the through-hole 56 and then fitted in the slide grooves 57.

Therefore, when the viewing walls 10 and 55 are contaminated by the garbage due to the birds, they may be easily separated from the body part 40 and the door member 50 for being cleaned or substituted with new ones, thereby clean view of users may always be assured.

Figure 2:
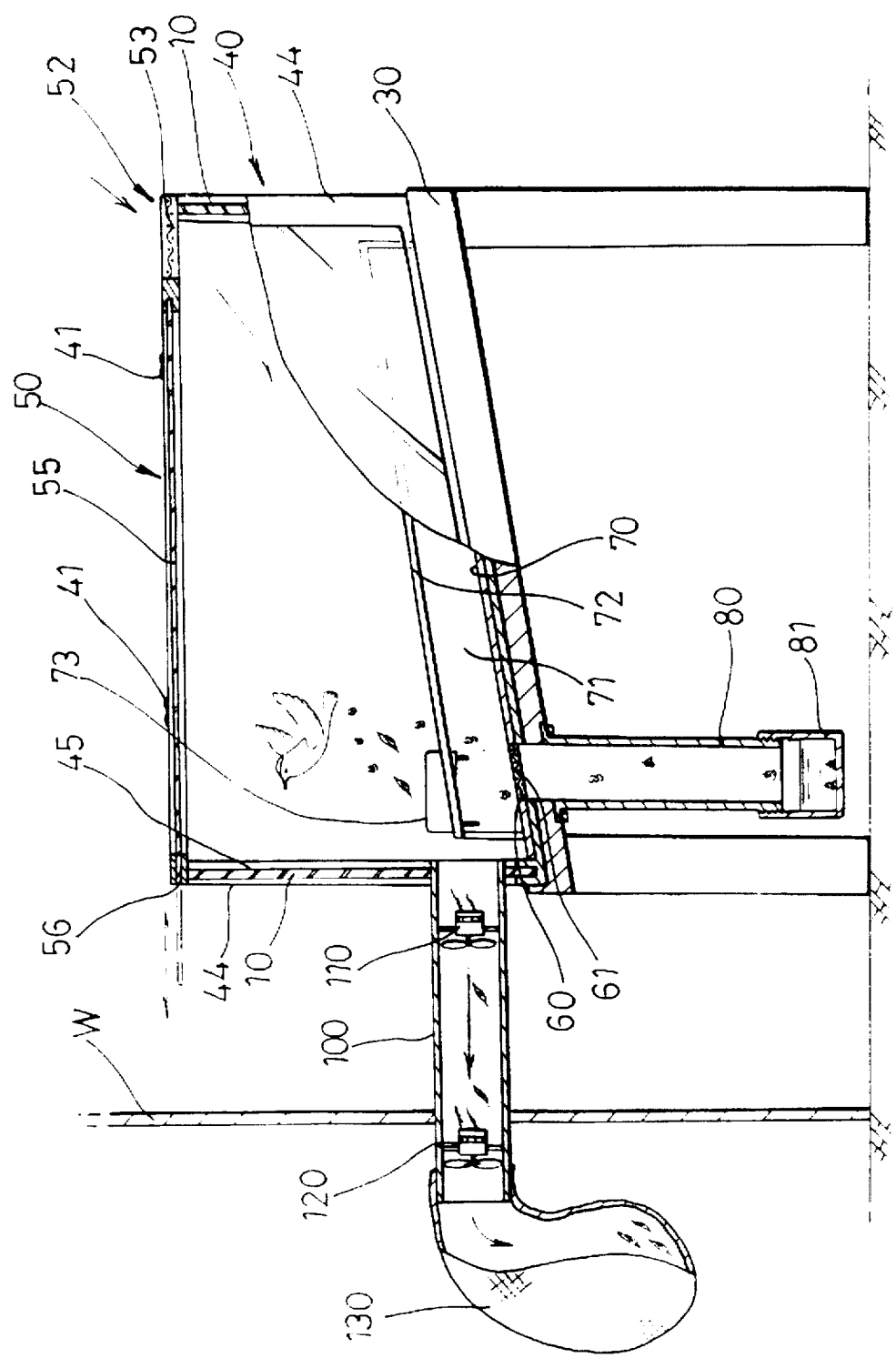
FIG. 2 is a cross-sectional view showing another embodiment of the bird house according to the present invention.
Figure 3:
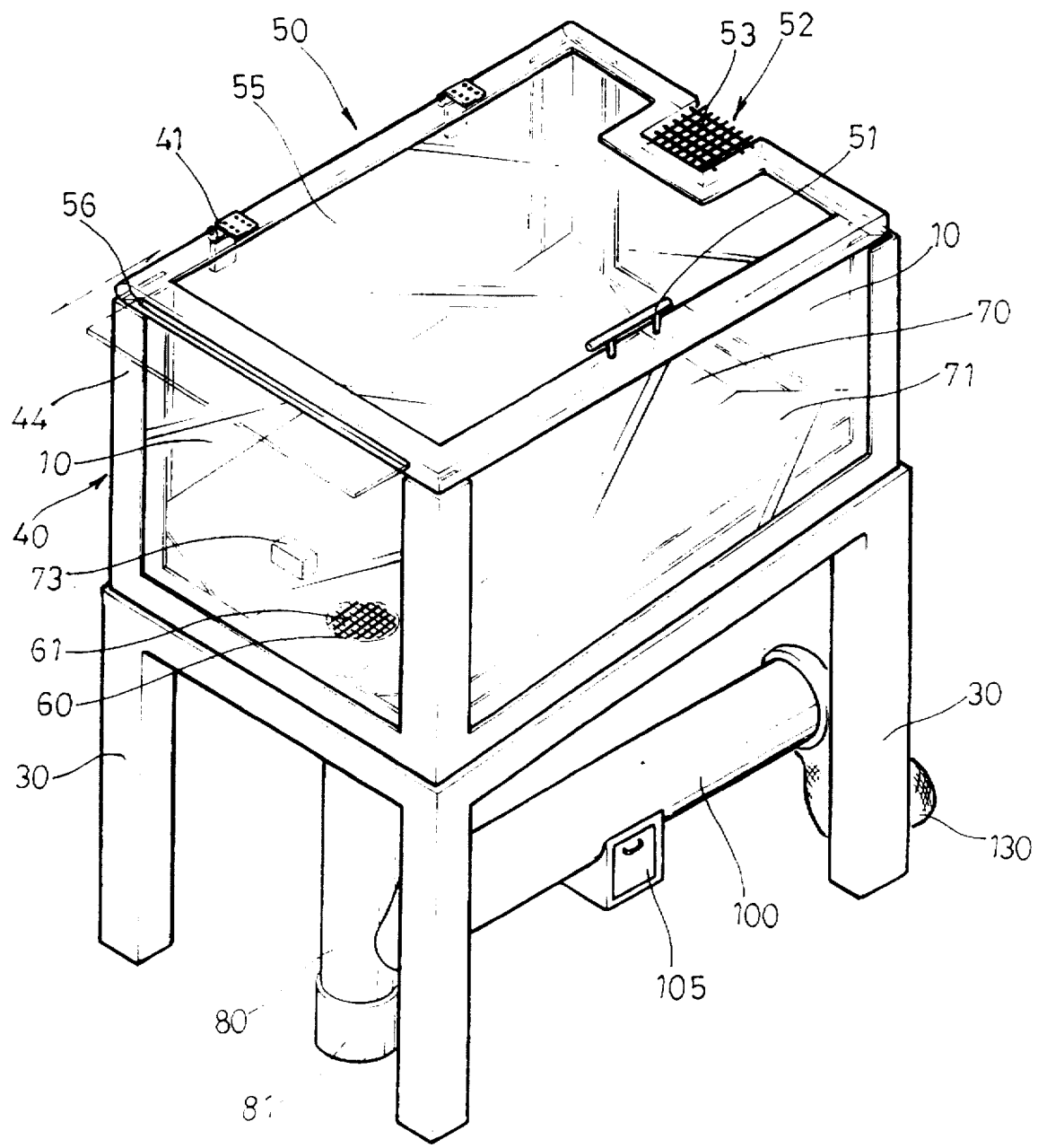
FIG. 3 is a schematical perspective view showing a further embodiment according to the present invention.

The bottom of the body part 40 is coupled with a bottom plate 70 which is slanted longitudinally as shown in FIG. 2. The bottom plate 70 comprises longitudinal side parts 71 which are slanted from edges to the center traversely as shown in FIG. 1 and FIG. 3. Because this bottom plate 70 is slanted, it becomes easy for the soil, feathers and scattered foodstuff of the birds to be gathered into the center due to the inclination.

The bottom plate 70 has a first outlet 60 on its lower center portion, to discharge the soil, and a feeder 73 for supplying foodstuff to the birds. The first outlet 60 is covered by a filtering net 61 for filtering feathers to prevent them from being discharged with the soil. One or more rods 72 may be installed inside space of the body part 40 for the birds to rest on them.

The first outlet 60 is communicated with a discharging pipe 80 which is extended downward from the body part 40. Then, the discharging pipe 80 is engaged with a first disposal box 81 at its free end part, by providing threaded parts respectively to the free end part of the discharging pipe 80 and the first disposal box 81 complementally.

The soil of the birds gathered in the center of the slanted bottom plate 70 may be discharged through the first outlet 60 to the first disposal box 81. When the first disposal box 81 is full of soil, the user can detach the first disposal box 81 from the discharging pipe 80 for cleaning and after cleaning. After cleaning, the first disposal box 81 is easily rejoined together with the discharging pipe 81 by the threaded parts.

On a viewing wall 10 is provided with a second outlet 90 for discharging the feathers to the outside and preventing them from being fallen on the bottom plate 70 as shown in FIG. 1.

Referring to FIG. 2, the second outlet 90 is communicated with one end part of a discharging pipe 100 which is extended outwardly from the body part 40 and provided with first and second fans 110 and 120 in a certain interval installed therein. The discharging pipe 100 is communicated with a second disposal bag 130 at the other free end part, so that the feathers and other dust may be inhaled through the discharging pipe 100 by the force of ventilation of the fans 110 and 120 and collected into the second disposal bag 130, thereby removing the garbage from the body part 40 and maintaining the inside of the body part 40 clean.

The discharging pipe 100 is extended outwardly from the second outlet 90 for a distance in any directions and connected with the second disposal bag 130, as shown in FIG. 1. Alternatively, the discharging pipe 100 may be extended outdoors through a wall of a room and the second disposal bag 130 is provided outdoors, as shown in FIG. 2.

Figure 4:
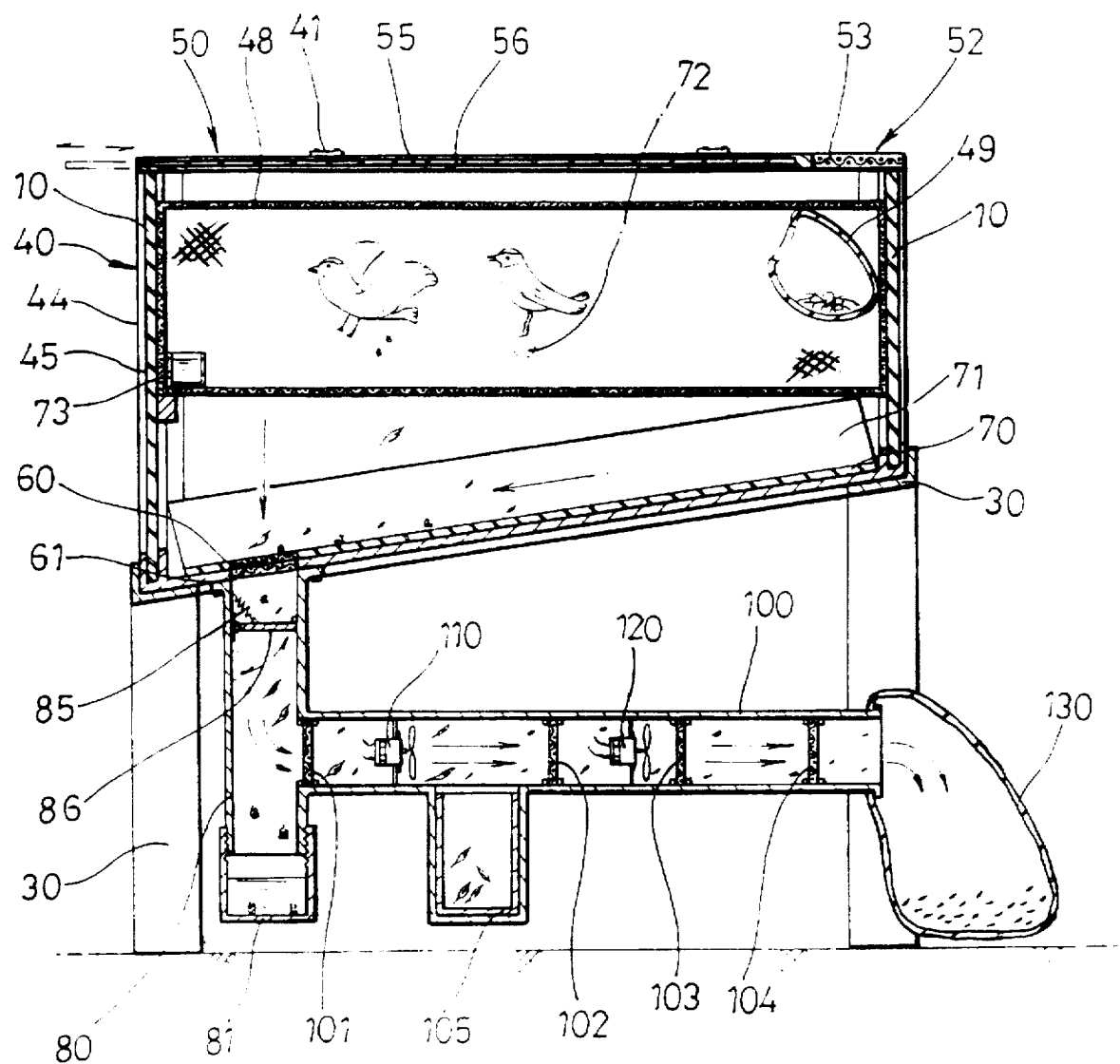
FIG. 4 is a cross-sectional view showing another embodiment of the bird house according to the present invention.

FIG. 4 shows a different discharging system according to another embodiment of the sanitary bird house.

In FIG. 4, the discharging pipe 100 includes a vertical pipe part and a horizontal pipe part.

The vertical pipe part is perpendicularly provided under the first outlet 60 and attached with the detachable first disposal box 81. In this case, the first outlet 60 is not covered with the filtering net 61 and a cover plate 86 is fixed partially to the upper surface inside the vertical pipe part and serves as a cover.

A spring 85 is provided to the inside of the vertical pipe part and has two end parts, of which one end is connected to the inner surface of the vertical pipe part and the other end is connected the upper surface of the cover plate 86 to hold the cover plate 86.

The spring 85 is usually in the retracted state for holding the cover plate 86 closed within the vertical pipe part. Therefore, when it is necessary to clean the box 81 because the first disposal box 81 is full of the garbage, the user can detach the first disposal box 81 for cleaning, while the cover plate 86 is closed.

When the garbage is accumulated on the cover plate 86 more than a certain amount, the spring 85 is stretched due to the weight of the garbage and hence the opening of the cover plate 86 is followed by the opening of the vertical pipe part, so that garbage gathered on the cover plate 86 is fallen into the first disposal box 81.

In the first disposal box 81, a small amount of water is poured to prevent the feathers from being flying and to collect them therein.

The horizontal pipe part is transversely extended from some position of the vertical pipe part. In the horizontal part of the discharging pipe 100, the first and second fans 110 and 120 are installed in a predetermined interval to inhale garbage through the pipe 100, so as to collect relatively light garbage into the second disposal net bag 130, which can not be fallen in the first disposal box 81.

The horizontal pipe part is provided with first to fourth filters 101, 102, 103 and 104 having different filtering force respectively, so that most of feathers may be filtered by the first and second filters 101 and 102 as shown in FIG. 4, and gathered into a second disposal box 105. The second disposal box 105 is installed between the first fan 110 and the second filter 120 under the horizontal pipe part and communicated with the inside of the horizontal pipe part.

This second disposal box 105 is formed in the shape of a drawer to be detachably attached to the horizontal pipe part and the corresponding part under the horizontal pipe part has complementary grooves, so that the second disposal box 105 may be easily separated by slidably pulling from the groove under the horizontal pipe part, as desired.

Further, a mesh 48 may enclose the upper space in the body part 40 to prevent the contamination of the viewing walls 10 and 55. In this case, the resting rod 72, a nest 49 and the feeder 73 should be positioned inside the mesh 48.

According to the present invention, the bird soil and feathers are discharged to the disposal bag or box through discharging pipes from the outlets formed on the lower part of the bottom plate and a viewing wall of the bird house, so that the inside of the bird house can be maintained clean from those garbage and bad smells caused therefrom.

Further, according to the present invention, the space such as individual bird lovers' houses or bird shops installed the sanitary bird houses can be maintained clean due to the closed type of bird houses which are surrounded by the transparent viewing walls, thereby the users of clean and safe view is assured. If interior decoration is adopted to this sanitary bird house, the bird house may be increased in value.

Those skilled in the art will readily recognize that these and various other modifications and changes may be made to the present invention without strictly following the exemplary application illustrated and described herein and without departing from the true spirit and scope of the present invention, which is set forth in the following claims.

What is claimed is:

1. A sanitary bird house comprises:
    a body part including a frame, provided with formed slide grooves, and viewing side walls introduced through said slide grooves in said frame, wherein one of said viewing side walls being provided with an outlet;

a base support located under said body part to hold said body part;

a door member associated with the body part by means of hinges on the top edges of said body part as a cover to open and/or close said body part and including a door frame provided with a through hole and door frame slide grooves, a further viewing wall inserted into said through hole and fitted with said slide grooves in said door frame, a vent port and a handle;

a bottom plate which is longitudinally slanted and fitted with the lower edges of said body part, and having longitudinal side portions which are slanted to the center from the edges and an outlet covered with a filtering net on a relatively lower portion; and a discharging system including discharging pipes having a plurality of fans and filters positioned in a certain interval and disposal bags, wherein one discharging pipe is installed between said outlet formed on at least one of said side walls of said body part and one of said disposal bags, and another discharging pipe is installed between said outlet formed on said bottom plate and another one of said disposal bags.

* * * * *